United States Patent

Danneil et al.

[11] 3,891,511
[45] June 24, 1975

[54] PRODUCTION OF VERY PURE BUTANEDIOL

[75] Inventors: Axel Danneil, Ludwigshafen; Erich Flickinger, Frankweiler; Heinz Graefje; Reinhold Plass, both of Ludwigshafen; Rudolf Schnur, Frankethal, all of Germany

[73] Assignee: Badische Anilin- & Soda-Fabrik Aktiengesellschaft, Ludwigshafen, Rhine, Germany

[22] Filed: July 17, 1972

[21] Appl. No.: 272,366

[52] U.S. Cl. .................. 203/81; 203/84; 260/637 R
[51] Int. Cl. ............................................. B01d 3/00
[58] Field of Search ....... 260/643 R, 637 R, 635 M; 203/81, 82, 84

[56] References Cited
UNITED STATES PATENTS

| | | | |
|---|---|---|---|
| 2,950,326 | 8/1960 | Hort | 260/635 M |
| 2,991,232 | 7/1961 | Lamb | 203/82 |
| 3,140,243 | 7/1964 | Feder | 203/81 |
| 3,156,629 | 11/1964 | Ester | 203/84 |
| 3,282,802 | 11/1966 | Clark | 260/643 R |
| 3,445,345 | 5/1969 | Katzen | 203/84 |
| 3,689,371 | 9/1972 | Kerber | 260/643 R |

Primary Examiner—Norman Yudkoff
Assistant Examiner—Hiram H. Bernstein
Attorney, Agent, or Firm—Johnston, Keil, Thompson and Shurtleff

[57] ABSTRACT

Production of very pure butanediol-1,4 by separating in column 1 crude butanediol into a fraction A containing butanediol and lower boiling components and a fraction B containing higher boiling components, separating fraction A in column 2 into an overhead and a bottoms product consisting of very pure butanediol and separating fraction B in column 3 into butanediol of lower purity and components of higher boiling point.

2 Claims, 1 Drawing Figure

BCC - Bubble Cap Column
RC - Rectifying Column

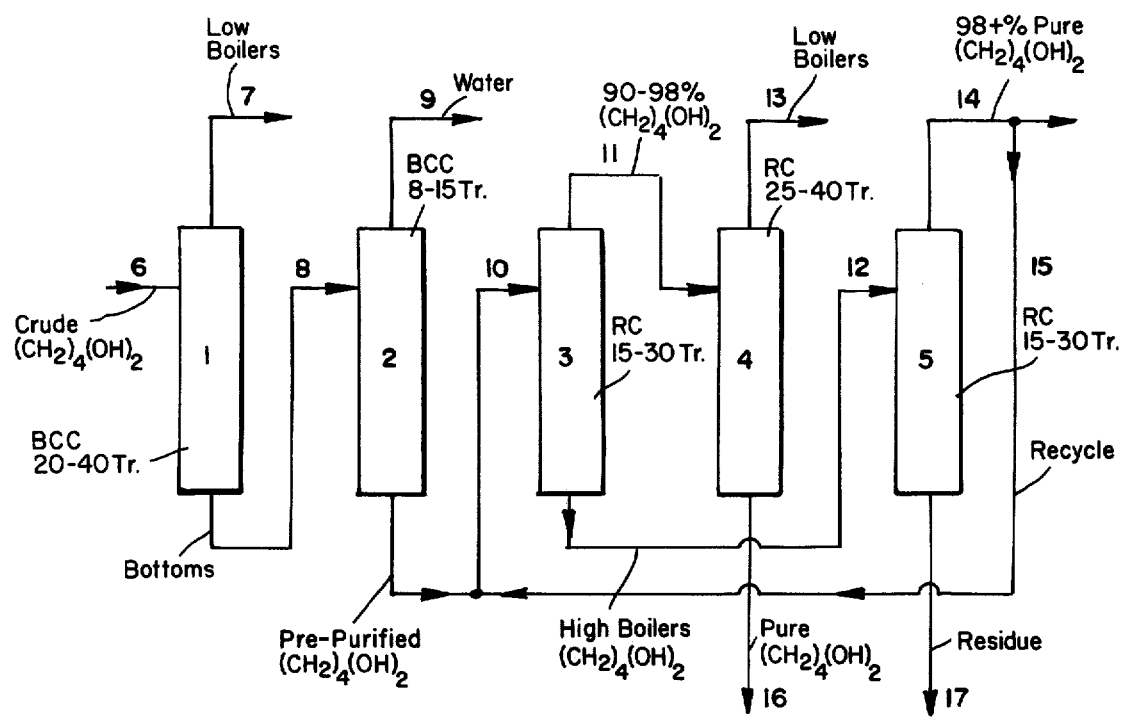

PRODUCTION OF VERY PURE BUTANEDIOL

This invention relates to a process for the production of highly pure butanediol by specifically directing the distillation of the butanediol freed from low-boiling constituents and water.

In the manufacture of butanediol by hydrogenation of butynediol a crude product is obtained which contains about 60 percent of water, 1 percent of methanol, 1.5 percent of propanol, 2 percent of butanol, and small amounts of unsaturated compounds, aldehydes, cyclic ethers, acetals and triols.

To separate these byproducts from the butanediol the following procedure is usually used. In a first column the low-boiling alcohols are distilled off. In a second column the butanediol is separated from the water. Then the butanediol is distilled off from the higher-boiling residue in a third column. In a fourth column a small amount of first runnings of low-boiling byproducts is separated. Finally, in a fifth column, the butanediol is again freed from small amounts of residue.

It has been found, however, that the butanediol manufactured in this way still contains, despite careful separation of the byproducts, small amounts of impurities which are troublesome in further processing. Especially when it is to be used as a component in polyesters or polyurethanes, the butanediol must be very pure.

It is an object of the present invention to provide a simple process, i.e., a process not involving increased expenditure for distillation equipment, for the production of highly pure butanediol that is particularly suitable for the production of polyesters and polyurethanes.

This object is achieved in accordance with this invention by separating crude butanediol, obtained by hydrogenation of an aqueous butyne-2-diol-1,4 solution and from which water and compounds having a boiling point of less than 120°C have been separated in a manner known per se, into a fraction A constituting 60 to 90 percent by weight of the starting mixture and containing butanediol and components having a lower boiling point than butanediol and a fraction B constituting 40 to 10 percent by weight of the starting mixture and containing butanediol and components having a higher boiling point than butanediol in a first column, separating fraction A in a second column into an overhead product consisting of the components having a lower boiling point than butanediol and a bottoms product consisting of very pure butanediol, and separating fraction B in a third column into butanediol of lower purity and the components having a higher boiling point than butanediol.

In this way there is obtained a very pure anhydrous butanediol which is eminently suitable for the production of polyesters and polyurethanes.

The less pure butanediol obtained from the third column is suitable for many applications; for example, it is pure enough for the production of tetrahydrofuran or butyrolactone.

If it is desired to process all or most of the butanediol contained in the starting mixture into very pure butanediol, some or all of the less pure butanediol obtained in the third column may be recycled to the first column to which it is supplied together with the crude butanol freed from water and low-boiling constituents. With reference to the accompanying drawing, the process may for example be carried out as follows.

The crude butanediol 6 obtained by hydrogenation of butynediol is supplied to a bubble-cap column 1 having 20 to 40 trays and a fraction 7 of constituents boiling below 120°C, such as methanol, n-propanol and n-butanol, is distilled off. The bottoms product 8 of column 1 is then fed to column 2, e.g., a bubble cap column with 8 to 15 trays, from which water is withdrawn as overhead 9 prepurified crude butanediol as bottoms product 10. This crude butanediol is passed to the first rectifying column 3, which may be a column of the usual design having 15 to 30 trays, from which an overhead product 11 and a bottoms product 12 is withdrawn. The quantity of overhead 11 is from 60 to 90 percent, preferably from 65 to 70 percent by weight of the pre-purified crude butanediol, the butanediol content of this overhead product being 90 to 98 percent, preferably 95 to 97 percent by weight.

In the second column 4 (with about 25 to 40 trays) the overhead 11 is completely freed from low-boiling constituents 13 and very pure butanediol is obtained as product 16. The bottoms product 12, which contains 93 to 97 percent, preferably 95 to 96 percent by weight of butanediol, is fed to a third column 5 (having about 15 to 30 trays) and separated into a residue 17, which is discarded, and a product stream 14 of less pure butanediol which contains more than 98 percent by weight of butanediol.

According to a variant of the process of the invention some or all of the stream 14 is recycled as stream 15 to column 3, to which it is supplied together with feed 10. In this way the total quantity of crude butanediol can be processed into very pure butanediol.

The invention will be further illustrated by the following Examples.

EXAMPLE 1

A mixture of 35.5 percent by weight of butanediol, 4.5 percent by weight of low-boiling alcohols, 1.5 percent by weight of other low-boiling impurities, 57.9 percent by weight of water and 0.6 percent by weight of high-boiling residue is freed from the low-boiling alcohols and 2 percent of water in a first column. In the second column the rest of the water is distilled off.

The practically water-free crude butanediol is passed into a third column where it is separated into a. a distillate containing the low-boiling impurities and about two thirds of butanediol and b. a bottoms product containing the high-boiling impurities, the residue and about one third of the butanediol.

The bottoms product is rectified, in a fourth column, to butanediol having the following composition:

| | |
|---|---|
| Bromine number: | 0.5 |
| CO number: | 0.8 |
| Solidification point: | 18.5 |
| Purity: | 98.3% |
| $H_2O$: | 0.1% |
| Low-boiling impurities: | 0.7% |
| High-boiling impurities: | 0.9% |

This product can be employed for many purposes.

The overhead product from the third column, which contains the low-boiling impurities and two thirds of the butanediol is separated in another column into a distillate containing the low-boiling impurities and a bottoms product containing the butanediol. The butanediol obtained as bottoms product has the following composition:

| | |
|---|---|
| Bromine number: | 0.05 |
| CO number: | 0.03 |
| Solidification point: | 19.8 |
| Purity: | 99.7 % |
| $H_2O$: | not detectable |
| Low-boiling impurities: | 0.05% |
| High-boiling impurities: | 0.20% |

COMPARATIVE EXAMPLE

For comparison, butanediol obtained in accordance with paragraph 1 of this Example is distilled by the prior art method and the distillate is separated from 0.8 percent of residue; small amounts of impurities whose boiling points lie between that of butanediol and that of the residue pass over together with the butanediol. After separation of the low-boiling alcohols in a subsequent column, the butanediol is subjected to final purification in a further distillation column.

The product has the following composition:

| | |
|---|---|
| Bromine number: | 0.25 |
| CO number: | 0.16 |
| Solidification point: | 19.60 |
| Purity: | 99.4 % |
| $H_2O$: | 0.03% |
| Low-boiling impurities: | 0.30% |
| High-boiling impurities: | 0.27% |

The comparision shows that the new process makes it possible to significantly improve the quality of the butanediol.

EXAMPLE 2

The mixture indicated in Example 1 and consisting of butanediol, low-boiling alcohols, other low-boiling impurities, water and high-boiling residue is freed from low-boiling alcohols and water as described in Example 1. The anhydrous crude butanediol is separated, by the method described in Example 1, into a distillate containing two thirds of the butanediol and the low-boiling impurities and a bottoms product containing one third of the butanediol and the high-boiling impurities. The bottoms product is rectified to give a butanediol having the composition indicated in Example 1. This product is returned to the third column together with fresh crude butanediol. The pure butanediol obtained as bottoms product in the fourth column has, within the limits of error, the same composition as the pure product obtained in Example 1.

We claim:

1. In a process for the production of very pure butanediol-1,4 by distillation of crude butanediol containing as impurities water, methanol, propanol, butanol and small amounts of unsaturated compounds, aldehydes, cyclic ethers, acetals and triols and obtained by hydrogenation of an aqueous butyne-2-diol-1,4 solution and from which water and compounds having a boiling point of less than 120°C have been separated as distillate overhead to obtain a butanediol residue essentially free of water and compounds with boiling points of more than 120°C, the improvement which comprises separating said butanediol fraction in a first distillation column into an overhead fraction A constituting 60 to 90% by weight of said residue and containing butanediol and residual components having a lower boiling point than butanediol and a fraction B constituting 40 to 10 percent by weight of said residue and containing butanediol and components having a higher boiling point than butanediol, recovering very pure butanediol-1,4 by separating fraction A in a second distillation column into an overhead product consisting of the impurity components having a lower boiling point than butanediol and a bottoms product consisting of said very pure butanediol-1,4, and separating fraction B in third distillation column into an overhead product consisting of more than 98 percent by weight of butanediol and residual impurities having a higher boiling point than butanediol.

2. A process according to claim 1, which comprises feeding the butanediol obtained as an overhead product in the third distillation column together with said butanediol residue to said first distillation column.

* * * * *